Oct. 29, 1957 — H. WARP — 2,811,392
OUTLET CONTROL PLUG FOR IRRIGATION TUBING
Filed Aug. 23, 1955
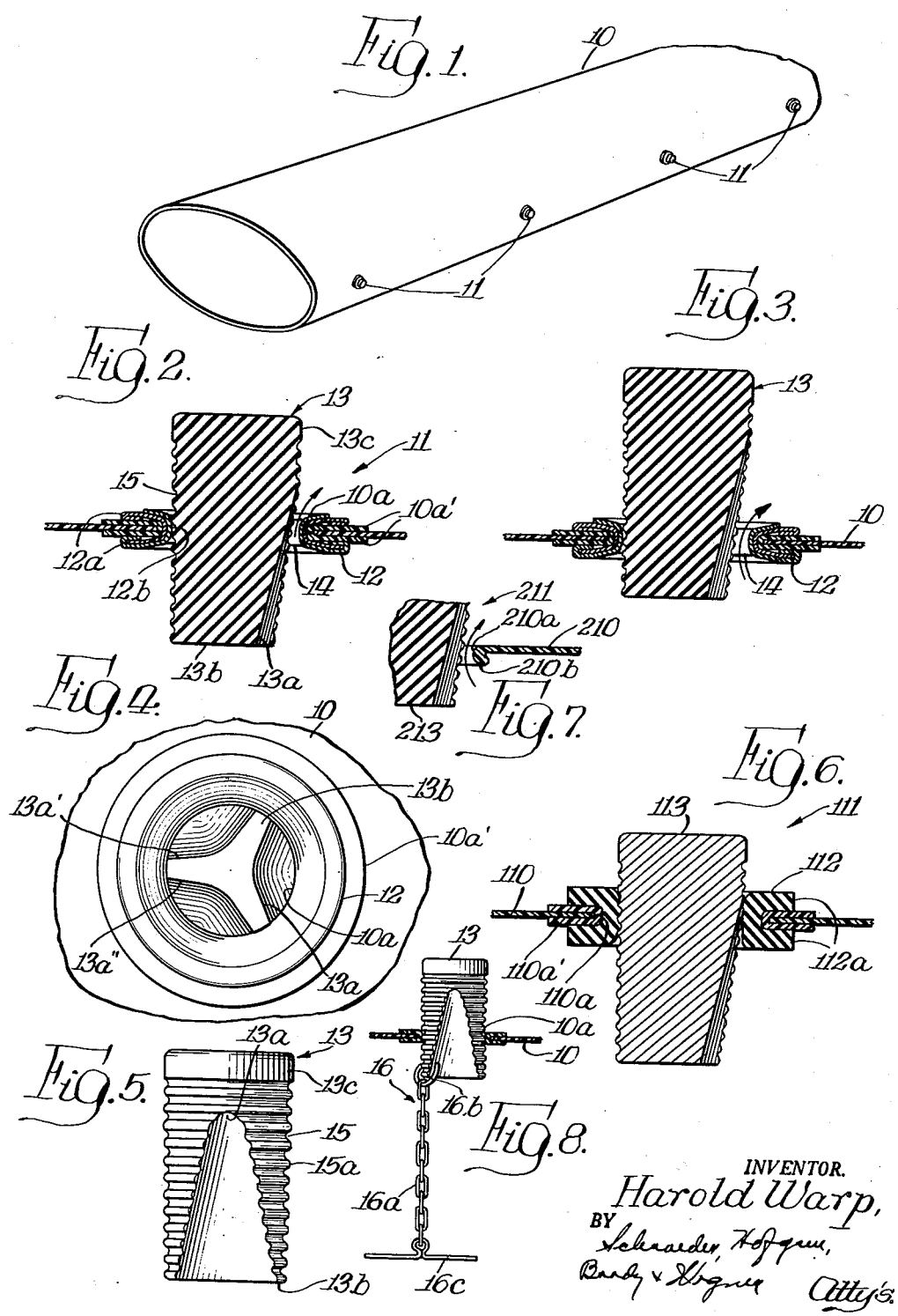
INVENTOR.
Harold Warp ic Office

2,811,392
Patented Oct. 29, 1957

2,811,392

OUTLET CONTROL PLUG FOR IRRIGATION TUBING

Harold Warp, Chicago, Ill., assignor to Flex-O-Glass, Inc., a corporation of Illinois Application August 23, 1955, Serial No. 530,069

2 Claims. (Cl. 299—106)

This invention relates to an irrigation duct and, in particular, to an outlet control plug for regulating the flow of liquid from irrigation tubing.

For improving yields in dry areas and for reclaiming arid areas, agriculturists employ methods of irrigation wherein water is conducted from a remote source through suitable means and distributed to the desired growing areas. Such an artificial method of providing water to the soil is costly as compared to the use of natural rainfall for such purposes, and it is necessary therefore for one utilizing the artificial irrigation method to maximize efficiency in the utilization of the available water.

As farm lands are relatively extensive in area, it is necessary to provide irrigation ducts which are of simple and inexpensive construction and yet which allow controlled discharge of the water into any portion of the selected area. To this end, duct means such as open ditches or large capacity hoses, have been used, such means being provided at spaced intervals with outlets through which the water may be discharged onto the adjacent ground. In some instances, means have been provided to control the flow of the water from each of the separate discharge outlets; such means now in the art, however, have the serious disadvantages of being relatively complicated and expensive of manufacture, thereby precluding their use by a large number of such farmers.

It is the principal object of my invention to provide a new and improved irrigation duct having inexpensive and effective liquid flow discharge control means.

Another object of the invention is to provide an irrigation duct comprising tubular means for carrying irrigating liquid from a source and having longitudinally spaced discharge openings provided with new and improved flow control means.

A further object is to provide an irrigation duct as described above wherein the liquid flow control means comprises an eyelet secured to the duct surrounding an opening, and a control plug frictionally retained in the eyelet and having an exterior, variable cross section groove forming a passage between the exterior and the interior of the tube which by adjustably positioning the plug in the eyelet has a variable flow limiting cross section.

A yet further object is to provide a liquid flow control means for use in an irrigation duct comprising an annular eyelet having an axially adjustable cylindrical plug frictionally retained therein with said plug having at least one tapered groove extending from one end of said plug to form a passage between the plug and the eyelet, the minimum cross sectional area of said passage being adjustable by longitudinal movement of the plug in the eyelet.

A yet further object is to provide a liquid flow control means having a plug as described above wherein the groove extends only partially longitudinally of the plug so that one end of the plug may act as a flow stopping means when positioned within the eyelet.

A yet further object is to provide such a cylindrical plug having a plurality of circumferential grooves for providing improved frictional coaction between the plug and the eyelet.

Other features and advantages of this invention will be apparent from the following description taken in connection with the accompanying drawings, wherein:

Figure 1 is a perspective view of part of an irrigation duct having liquid flow control means embodying the invention;

Figure 2 is a diametrical sectional view of the liquid flow control means mounted on a portion of the irrigation duct tube and with the control plug in an intermediate flow position;

Figure 3 is a view similar to Figure 2 but with the control plug positioned to allow increased flow;

Figure 4 is an end view of the liquid flow control means mounted on a portion of the irrigation duct tube;

Figure 5 is an elevational view of the control plug;

Figure 6 is a diametrical sectional view of a modified form of liquid flow control means mounted on a portion of the irrigation duct tube;

Figure 7 is a fragmentary view of another modified form of flow control means; and Figure 8 is an elevational view of a control plug mounted in a portion of the irrigation duct tube with a retaining means attached.

In the exemplary embodiment of the invention disclosed in Figures 1 to 5 of the drawings, the irrigation duct is seen to comprise a tube 10 for conducting irrigating liquid, such as water, from a source (not shown) to the general area to be irrigated. At longitudinally spaced intervals, tube 10 is provided with discharge or outlet openings 10a through which the irrigating water may flow outwardly from the interior of tube 10 and onto the ground immediately adjacent the individual openings. To adjustably regulate the discharge of the water from each of the openings, flow control means 11 are provided; the control means provided at each opening being identical to that provided at the other openings, I will limit the description of control means 11 to one such device with the understanding that such description applies equally to all other such devices.

Control means 11 comprises an annular reinforcement or eyelet 12 in tube 10 and surrounding the opening 10a. Movably retained within the eyelet by frictional engagement therewith is a control plug 13 which is provided with at least one longitudinally extending exterior groove 13a forming a passage 14 between the plug 13 and eyelet 12. Groove 13a is tapered so that its greatest cross section occurs at one end 13b of plug 13 and thus longitudinal positioning of the plug 13 in the eyelet 12 allows a variation in the flow of liquid through passage 14 from a maximum flow with the plug 13 projecting most outwardly from the eyelet 12 to a minimum flow when the plug 13 is inserted fully into the eyelet. In the preferred embodiment, an outer end 13c of the control plug 13 projects beyond the small end of groove 13a which end when inserted into eyelet 12 completely blocks the flow therethrough. For aiding the retention of plug 13 in eyelet 12, circumferential grooves 15 are provided on the plug extending from adjacent end 13c to end 13b.

As best seen in Figures 2, 3, and 4, eyelet 12 preferably comprises an annular member having an outwardly opening U-shaped configuration. Surrounding opening 10a, tube 10 may be provided with reinforcing rings 10a', against which legs 12a of eyelet 12 may be forcibly clamped to have sealing engagement therewith. Inner surface 12b of eyelet 12 defines a circular opening through which the irrigating water may pass and in which is received the control plug 13. In the embodiment being described, eyelet 12 is preferably formed of a rigid material, such as metal.

Control plug 13 comprises a generally cylindrical member, preferably formed of a resiliently deformable material, as rubber, plastic, or cork, and having a diameter somewhat greater than the diameter of eyelet surface 12b so that plug 13 may be forcibly received in the eyelet opening. Plug 13 is provided with at least one longitudinally extending groove as 13a; in the embodiment shown I provide three such grooves 13a, 13a' and 13a", each being identical to the other. Groove 13a extends only partially the length of plug 13 with its deepest portion, or portion of greatest cross sectional area, at plug inner end 13b and tapering into the peripheral surface of the plug 13 adjacent outer end 13c. The frictional securing of plug 13 in eyelet 12, is sufficient to prevent dislodging of the plug 13 from the eyelet opening and yet allows longitudinal positioning of plug 13 in eyelet opening. Thus, any desired portion of groove 13a may be juxtaposed to eyelet surface 12b to obtain the desired minimum cross section of passage 14 and the desired flow of irrigating water. As seen in Figure 2, with plug 13 inserted in eyelet 12 to a depth where groove 13a has a relatively small cross section, passage 14 is relatively small. As seen in Figure 3, when plug 13 is positioned so that a relatively larger cross sectional area portion of groove 13a is juxtaposed to the eyelet surface 12b, passage 14 is relatively large.

When it is desired completely to block the flow of water through the eyelet opening, plug 13 is inserted into the eyelet so that outer end 13c is juxtaposed to the eyelet surface 12b. If the maximum flow through the eyelet opening is desired, plug 13 may be readily completely withdrawn from the eyelet 12. Thus, effective control of the flow of irrigating water from the tube 10 is obtained through the use of flow control means 11 from a completely blocked condition to one allowing substantially the maximum flow permitted by an unobstructed opening 10a.

While the resiliently deformable nature of the control plug 13 causes it to expand into holding engagement with the eyelet surface 12b, I have found that by providing a plurality of spaced circumferential grooves 15, as best seen in Figure 5, plug 13 is more securely retained in the eyelet against the action of the irrigating water pressure while yet readily allowing the longitudinal positioning desired. I have found that a very satisfactory configuration for such retention purposes is that wherein the grooves 15 are separated by lands 15a of comparable longitudinal width to the groove width and said groove width being less than the longitudinal dimension of eyelet inner surface 12b. Such construction allows positive retention of the plug 13 within eyelet 12 over the entire longitudinal length of this plug including that portion of the plug immediately adjacent inner end 13b where a minimum plug surface is available for engagement with the eyelet surface 12b. As groove 13a does not extend into outer end 13c, retention of plug 13 with end 13c within the eyelet 12 is satisfactorily obtained without grooves 15. When grooves 15 are provided, they are preferably disposed in planes perpendicular to the longitudinal axis of the plug 13 thereby precluding vectorial components of the compressional forces acting in the same direction as the irrigating water pressure.

In Figure 6, an exemplary embodiment of a modified form of flow control means 111 is shown to comprise a resiliently deformable, annular grommet 112 having an outwardly opening U-shaped configuration with legs 112a resiliently, sealingly engaging reinforcing ring 110a' surrounding an opening 110a in a duct tube 110. A modified control plug 113 similar to control plug 13 but formed of a rigid material, such as a metal, is received in the grommet 112 in frictional engagement with inner surface 112b of the grommet. The coaction between plug 113 and grommet 112 is reversely similar to that between plug 13 and eyelet 12.

A modified form of control means 211 is shown in Figure 7 wherein an irrigation duct tube 210, preferably formed of a plastic, moldable material such as rubber or a plastic, is provided with an opening 210a having a perimetrical reinforcment bead 210b for retaining a plug 213 which is generally similar to plugs 13 and 113. Bead 210b may be formed by passing a heated element, such as a soldering iron, through the tube opening 210a. Plug 213 has cooperative action with bead 210b similar to the action between plug 13 and eyelet 12.

In Figure 8 is shown a plug 13 mounted in a duct opening 10a and having a retaining means 16 comprising a flexible element or chain 16a secured at one end by a ring 16b to the plug 13 and having a laterally extending stop bar 16c attached at the other end and disposed within the duct 10. When plug 13 is completely withdrawn from the opening 10a, it may move outwardly therefrom only a distance equal to the length of the chain 16a, with stop bar 16c extending across the opening 10a to prevent further outward movement. Loss of the plug 13 is thus effectively prevented without interfering with the normal functioning of control means 11.

The use of the irrigation duct with my novel flow control means is extremely simple. Duct 10 is extended along the ground adjacent the area which is to be irrigated and with the openings 10a directed toward this area. Each of the flow control means 11 is positioned to allow the desired flow from the openings 10a. Where it is desired to use certain portions of the duct merely to conduct the water to other portions and no irrigating flow from the openings 10a in the conducting portions is desired, the flow control means 11 of the conducting portions are merely inserted into the blocking position wherein outer end 13c is retained within the eyelet 12. Where relatively large quantities of flow are required, the control plugs 13 are withdrawn from the eyelet to a substantial extent and where lesser quantities of flow are desired, the plugs are inserted to a greater extent. The novel construction of my flow control provides positive retention of the positioning of the plug in the eyelet notwithstanding the action of the hydrostatic and dynamic pressures produced by the irrigating water within the tube 10. Adjustment of the positioning of the control plug 13 relative to the eyelet 12 may be effected at any time.

Utilization of flow control means 111 and 211 is in all respects similar to that of flow control means 11. To preclude inadvertent loss of the control plugs 13, 113 or 213, when they are completely withdrawn from the openings, retaining means 16 may be attached to the plugs without affecting the functioning thereof, as described above.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Liquid flow control means for use in an irrigation duct having an outlet opening, comprising: an annular eyelet adapted to be sealingly secured to the duct surrounding the opening; a cylindrical control plug movably secured in said eyelet and having a plurality of tapered, exterior grooves extending longitudinally of the plug from one end thereof and arranged to form variable cross-section passages between the eyelet and the plug to provide communication between the interior and exterior of the duct, and a plurality of spaced, circumferential grooves right angularly intersecting said longitudinal grooves; and retaining means comprising a stop bar disposed interiorly of the duct and extending laterally at least across the outlet opening, and means for securing said bar to said plug allowing removal of the plug completely from the eyelet while maintaining the association of the plug with the duct.

2. Liquid flow control means for use in an irrigation duct having an outlet opening, comprising: an annular eyelet adapted to be sealingly secured to the duct surrounding the opening; and a cylindrical control plug movably secured in said eyelet and having a tapered, exterior groove extending longitudinally of the plug from one end thereof, said groove being arcuately concave about its longitudinal extent with its deepest portion at said one end of the plug, the width of the groove and the depth of the groove jointly decreasing toward the other end of the plug, and the groove terminating intermediate said plug ends, the width of the groove further being correlated with the depth thereof whereby the groove is shallow, said groove being arranged thereby to form a variable cross-section passage between the eyelet and the plug to provide communication between the interior and the exterior of the duct, and a plurality of spaced, circumferential grooves intersecting said longitudinal grooves for coaction with the eyelet to retain the plug longitudinally through the eyelet with the groove in a desired position relative to the eyelet to control the flow of liquid through the eyelet, at least one of said eyelets and said plug being resiliently deformable.

References Cited in the file of this patent

UNITED STATES PATENTS

| | | |
|---|---|---|
| 1,035,980 | Lowry | Aug. 20, 1912 |
| 1,112,622 | Jones | Oct. 6, 1914 |
| 1,143,351 | Benson | June 15, 1915 |
| 1,527,222 | Rasmussen | Feb. 24, 1925 |
| 2,628,865 | Duncan | Feb. 17, 1953 |